United States Patent Office 3,838,128
Patented Sept. 24, 1974

3,838,128
PROCESS FOR THE PREPARATION OF CERTAIN N-3 - SUBSTITUTED - 6-(TRICHLOROMETHYL) URACILS
Albert William Lutz, Montgomery Township, N.J., and Susan Hensen Trotto, Yardley, Pa., assignors to American Cyanamid Company, Stamford, Conn.
No Drawing. Filed Nov. 22, 1971, Ser. No. 201,187
Int. Cl. C07d 51/30
U.S. Cl. 260—260                                    4 Claims

ABSTRACT OF THE DISCLOSURE

This invention relates to novel 3-substituted-6-(trichloromethyl)uracils and a process for the preparation thereof. The compounds find utility as herbicides.

---

The present invention relates to certain N-3-substituted-6-(trichloromethyl)uracils and their preparation. It further relates to the post- and pre-emergence herbicidal activity of said uracil compounds.

The novel compounds of the present invention have the formula:

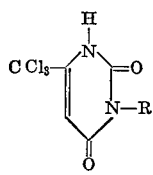

wherein R is a straight or branched chain alkyl $C_1$-$C_6$, a straight or branched chain alkylene $C_2$-$C_6$ or phenyl.

While a number of related compounds are known in the herbicidal literature, the subject compound is novel, probably because it cannot be satisfactorily prepared by the conventional synthetic routes for such compounds.

One conventional route for preparation of such compounds involves the condensation of a β-aminocrotonate and an isocyanate. Unfortunately, in attempting to prepare the subject compounds the condensation sluggishly proceeds to produce tar or results in the recovery of the starting materials.

Where direct, exhaustive chlorination of the 6-methyl group is attempted, nuclear chlorination of the uracil preferentially occurs in the 5-position.

Direct chlorination or bromination of alkyl pyrimidines is uncertain as to the degree of substitution which results and generally results in substitution at the 5-position. Where chlorination of the methyl group of 3-sec-butyl-5-bromo-6-methyluracil is attempted using chlorine and refluxing glacial acetic acid, the result is recovery of the starting material.

The use of sulfuryl chloride and sodium acetate in glacial acetic acid or in aprotic solvents, such as, chloroform or xylene, has been recommended for the preparation of 3-alkyl-5-chloro-6-methyluracils. It has been observed that in the presence of sulfuryl chloride in glacial acetic acid which contains 10% acetic anhydride, 6-methyl uracil is converted to 5-chloro-6-methyluracil.

It has now been discovered that the 3-substituted-6-(trichloromethyl)uracils can be conveniently synthesized by reacting from about 2 to about 3.3 equivalents of sulfuryl chloride per mole of the corresponding 3-substituted-6-methyluracil by conducting the reaction in acetic acid which contains from 2% to 20% of acetic anhydride at a reaction temperature between about 25° C. and about 75° C. It is preferred to employ 3 equivalents of sulfuryl chloride, 8% to 12% by weight of acetic anhydride and temperatures in the range of from 50° C. to 60° C. Where the reaction is carried out at about 25° C., the reaction will be completed in from about 15 to 20 hours. Where it is conducted at the higher preferred range, namely 50° C. to 60° C., the reaction will be completed in from about 1 to 2 hours.

The above reaction parameters are critical to the successful practice of the present invention. Where they are carefully followed, the desired compound can conveniently be synthesized. The reaction scheme employed can be graphically illustrated as follows:

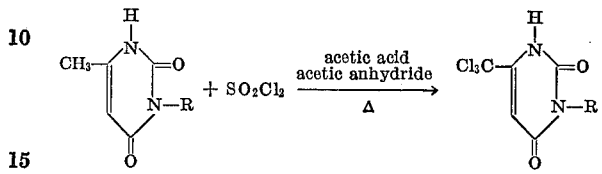

where R is alkyl $C_1$-$C_6$, alkylene $C_2$-$C_6$ or phenyl.

For use as herbicides, the compounds may be conventionally formulated and applied to the undesired plants. The term plants includes seeds in the case of the pre-emergence control methods.

For example, they may be prepared as dusts, dust concentrates, wettable powders, and the like, and applied as solids or liquids with conventional dusting or spraying equipment.

Generally about 4 to 25 pounds per acre of active ingredient, and preferably 4 to 10 pounds per acre of active compound, is effective for obtaining the control desired.

Dusts are usually prepared by grinding together from about 2% to 25% by weight of the active compound with a solid diluent or carrier, such as finely divided attapulgite, talc, diatomaceous earth, kaolin, powdered walnut shell, fuller earth, or the like, with or without sticking agents, wetting agents, or the like. Dust concentrates are made in the same manner using a greater amount of active herbicide, for example 25% to 90% by weight of said material.

The compounds of the invention may also be prepared as granular formulations by dissolving the active material in a solvent, such as acetone, and applying the thus-formed solution to a sorptive granular carrier, such as attapulgite or kaolin granules. Such formulations are usually made up as 10% to 15% (active material) granules. Granular formulations using non-sorptive granules, such as sand, limestone, oyster shell, or the like, may also be prepared. These formulations are made up by applying a binder, such as a fertilizer solution, sugar solution, or the like, to the nonsorptive granules and coating the wetted particles with a dust or dust concentrate containing the active compound.

Wettable powders are generally prepared in the same manner as the dust concentrates; however, in these formulations there is also generally incorporated from about 1% to 5% by weight of a dispersant, such as the sodium lignosulfonate or the monocalcium salt of a polymerized alkyl aryl sulfonic acid and/or from about 1% to 5% by weight of a wetting agent; for example, the oleic acid ester of sodium isothionate.

Representative wettable powder formulations which can be prepared are:

(A)

25% 3-isopropyl-6-(trichloromethyl)uracil
71% attapulgite
2% naphthalene sulfonic acid condensate
2% sodium N-methyl-N-oleoyl taurate (B)

50% 3-n-butyl-6-(trichloromethyl)uracil
45% attapulgite
3% Marasperse N
2% ester of sodium isothionate (C)

75% 3-isopropyl-6-(trichloromethyl)uracil
20% diatomaceous earth
3% naphthalene sulfonic acid condensate
2% ester of sodium isothionate The invention is further illustrated by the examples set forth below which are not to be taken as being limitative thereof. In each case, weights and percentages are by weight unless otherwise indicated.

EXAMPLE 1

Preparation of 3-isopropyl-6-(trichloromethyl)uracil

Sulfuryl chloride (36 grams, 270 mmoles) is added to a solution of 3-isopropyl-6-methyluracil (15 grams, 90 mmoles) in 300 ml. 10% acetic anhydride-acetic acid and warmed to 50° C. to 60° C. for one hour with stirring. The solution is then poured into 250 ml. of cold water, and the resulting fine white solid collected to give 15.4 grams (63.2%) of product, shown to be pure by thin layer chromatography (TLC), with a melting point of 125° C. to 128° C. Ultraviolet and NMR spectra confirmed that a rearrangement of the 3-isopropyl group to the 1-position had not occurred.

When the reaction mixture is allowed to stand at room temperature for 18 hours after the one-hour warming period, the yield is raised to 68.2%. Without the one-hour warming period, the yield drops to 61.4%.

Successful preparation of the desired product was confirmed by elemental analysis. Calculated for $C_8H_9Cl_3N_2O_2$:

C, 35.59; H, 3.34; Cl, 39.17; N, 10.32. Found: C, 35.65; H, 3.32; Cl, 39.05; N, 10.25

EXAMPLES 2–12

Following the procedure of Example 1, but varying the ratio of sulfuryl chloride to 3-isopropyl-6-methyluracil and/or the reaction time and temperature demonstrates the critical nature of the above-mentioned conditions in the production of the compounds of the present invention. The data obtained and reported in Table I show that the desired product is obtained with sulfuryl chloride to 6-methyluracil ratios between 2:1 to 3.3:1. The data also demonstrate that when the reaction temperature is approximately 25° C., from about 18 to 20 hours is required to satisfactorily complete the reaction; however, when the reaction temperature is about 50° C. to 60° C., optimum reaction time is about one hour.

In Table I below, the term "rearranged product" is meant to indicate the product of the following reaction:

EXAMPLE 13

Preparation of 3-n-butyl-6-trichloromethyluracil

Sulfuryl chloride (40.5 grams, 0.3 mole) is added to a solution of 3 - n - butyl - 6 - methyluracil (28.6 grams, 0.1 mole) in 500 ml. 10% acetic anhydride-acetic acid and warmed to 50° C. to 60° C. for 1.5 hours with stirring. The solution is poured into 400 ml. of cold water and a white solid precipitates. The mixture is filtered and the product, which has a melting point of 150° C. to 152° C., is collected. The NMR (deuteriochloroform) shows signals at 386 Hz. (ring H) and 659 Hz. (br, 1-NH).

*Analysis.*—Calculated for $C_9H_{11}Cl_3N_2O_2$: C, 37.85; H, 3.88; Cl, 37.25; N, 9.81. Found: C, 37.82; H, 3.82; Cl, 37.26; N, 9.81.

Substituting 3 - phenyl - 6 - methyluracil for 3 - n-butyl - 6 - methyluracil in the above reaction yields 3-phenyl - 6 - trichloromethyluracil. Similarly, with the appropriate 3 - substituted - 6 - methyluracil in the above reaction, the following compounds are obtained:

3-methyl-6-trichloromethyluracil,
3-hexyl-6-trichloromethyluracil,
3-allyl-6-trichloromethyluracil,
3-pentenyl-6-trichloromethyluracil,
3-(2-pentyl)-6-trichloromethyluracil,
3-(3-pentyl)-6-trichloromethyluracil, and
3-*sec*-butyl-6-trichloromethyluracil.

EXAMPLE 14

The pre-emergence herbicidal activity of the compounds of the invention is exemplified by the following tests in which the seeds of a variety of monocotyledonous and dicotyledonous plants are separately mixed with potting soil and planted on top of approximately one inch of midwest soil in separate pint cups. After planting, the cups are sprayed with the selected aqueous-acetone solution containing test compound in sufficient quantity to provide the equivalent of 25 pounds per acre of test compound per cup, or they are first watered and then sprayed to establish activity in wet, as well as dry, soil. The treated cups are then placed on greenhouse benches and cared for in accordance with greenhouse procedures. Four weeks after treatment, the tests are terminated and each cup is examined and rated according to the rating system set forth below. The tabulated results of these tests are reported in Table II below, using the following rating systems and abbreviations.

Rating system:

0—no effect
1—possible effect
2—slight effect
3—moderate effect

TABLE I

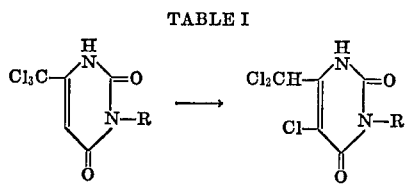

| Example number: | Equivalents SO₂Cl₂ | Reaction time in hours | Reaction temperature | Products | Yield, percent |
|---|---|---|---|---|---|
| 3 | 3 | 18 | 25° C | 3-isopropyl-6-trichloromethyluracil (ir, tlc) | 68.2 |
| 4 | 3 | 1 | 50–60° C | do | 63–68 |
| 5 | 3 | 20 | 2 hours—50–60° C., 18 hours—25° C | 3-isopropyl-6-trichloromethyluracil + rearranged product (tlc). | |
| 6 | 3 | 23 | 5 hours—50–60° C., 18 hours—25° C | 3-isopropyl-6-trichloromethyluracil <rearranged product (tlc) | |
| 7 | 3.3 | 20 | 2 hours—50–60° C., 18 hours—25° C | Almost entirely rearranged product (tlc, nmr) | |
| 8 | 1 | 1 | 25° C | No reaction (tlc) | |
| 9 | 2 | 1 | 25° C | do | |
| 10 | 2 | 1 | 50–60° C | 3-isopropyl-6-trichloromethyluracil (ir, tlc) | |
| 11 | 4 | 18 | 25° C | Unidentified products | |
| 12 | 4 | 72 | 25° C | Rearranged product (tlc) | |

Rating system:

5—definite injury
6—herbicidal effect
7—good herbicidal effect
8—approaching complete kill
9—complete kill
4—abnormal growth, i.e., a definite physiological malformation but with an over-all effect less than a 5 on the rating scale.

Percent difference in growth from the check: [1]

| | |
|---|---|
| 0 | 61–75 |
| 1–10 | 76–90 |
| 11–25 | 91–99 |
| 26–40 | 100 |
| 41–60 | |

[1] Based on visual determination of stand, size, vigor, chlorosis, growth malformation and over-all plant appearance.

Plant abbreviations:

| | |
|---|---|
| CR—Crabgrass | KO—Kochia |
| PI—Pigweed | GF—Greenfoxtail |
| LA—Lambsquarters | AW—Alligator weed |
| WO—Wild Oats | BW—Bindweed |
| MU—Mustard | CT—Canada Thistle |
| TO—Tomato | JG—Johnson grass |
| WH—Wheat | NS—Nutsedge |
| RA—Radish | QG—Quackgrass |
| MI—Millet | BA—Barnyard grass |

TABLE II.—PREEMERGENCE ACTIVITY

| Compound | lb. rate/acre | MU | MI | WH | RA |
|---|---|---|---|---|---|
| 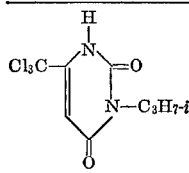 | 25 | 9 | 7 | t9 | t9 |
| 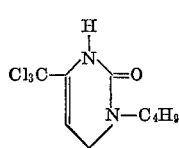 | 25 | 7 | 8 | 0 | 0 |

EXAMPLE 15

Post-emergence herbicidal activity

The post-emergence herbicidal activity of compounds of the present invention is demonstrated by treating a variety of monocotyledonous and dicotyledonous plants with the compounds dispersed in aqueous-acetone mixtures. In the test, seedling plants are grown in "Jiffy" flats for about two weeks. The test compounds are dispersed in 50/50 acetone-water mixtures in sufficient quantity to produce the desired concentrations which will provide the equivalent of 4 or 10 pounds per acre of active compound when applied to the plants through a spray nozzle operating at 30 p.s.i. for a predetermined time. After spraying, the plants are placed on greenhouse benches and are cared for in the usual manner, commensurate with conventional greenhouse practices. Two weeks after treatment, the seedling plants are examined and rated according to the rating system provided heretofore. Data obtained appear in Table III below.

TABLE III.—POSTEMERGENCE ACTIVITY

| Compound | Lb./acre | KO | LA | MU | PI | BA | CR | WO | TO | WH | GF | AW | BW | CT | JG | NS | QG |
|---|---|---|---|---|---|---|---|---|---|---|---|---|---|---|---|---|---|
| 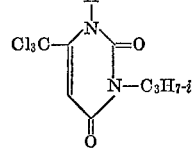 | 10 | | 9 | 9 | 0 | 0 | 9– | | 8 | t | t | | | | | | |
| | 4 | 3 | 9– | 9– | | 7 | 0 | t | | t | | t | 9 | t | 9 | 0 | 0 | 0 |
| 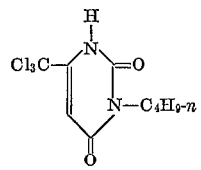 | 10 | | 9 | 9 | 9 | 8 | t | t | 9 | | t | | | | | | |

We claim:
1. A method for the preparation of compounds of the formula:

where R represents a member selected from the group consisting of alkyl $C_1$–$C_6$, allyl and phenyl comprising the step of, reacting a 6-methyl uracil of the formula:

where R is as defined above, with from about 2 to 3.3 equivalents of sulfuryl chloride per mole of said uracil in a solution of acetic acid containing 2% to 20% by weight of acetic anhydride at a temperature between 25° C. and 75° C.

2. A method according to Claim 1 wherein the solution of acetic acid contains from 8% to 12% by weight of acetic anhydride and the reaction mixture is heated to a temperature between 50° C. and 60° C. for not more than 1.5 hours.

3. A method according to Claim 1 wherein the solution of acetic acid contains from 8% to 12% by weight of acetic anhydride and the reaction temperature is maintained at about 25° C. for about 15 to 20 hours.

4. A method according to Claim 2 wherein 3 equivalents of sulfuryl chloride per mole of uracil are employed.

References Cited

UNITED STATES PATENTS

| | | | |
|---|---|---|---|
| 3,235,357 | 2/1966 | Loux | 260—260 |
| 3,250,776 | 5/1966 | Friedlander et al. | 260—260 |
| 3,480,631 | 11/1969 | Cummins | 260—260 |
| 3,580,913 | 5/1971 | Lutz | 260—260 |

DONALD G. DAUS, Primary Examiner

A. M. T. TIGHE, Assistant Examiner

U.S. Cl. X.R.

71—92